(12) United States Patent
Bolden

(10) Patent No.: US 10,922,049 B2
(45) Date of Patent: Feb. 16, 2021

(54) NATURAL LANGUAGE BASED COMPUTER ANIMATION

(71) Applicant: Roundfire, Inc., El Segundo, CA (US)

(72) Inventor: Allen L. Bolden, Long Beach, CA (US)

(73) Assignee: Roundfire, Inc., El Segundo, CA (US)

( * ) Notice: Subject to any disclaimer, the term of this patent is extended or adjusted under 35 U.S.C. 154(b) by 261 days.

(21) Appl. No.: 15/949,491

(22) Filed: Apr. 10, 2018

(65) Prior Publication Data
US 2018/0293050 A1 Oct. 11, 2018

Related U.S. Application Data

(60) Provisional application No. 62/484,116, filed on Apr. 11, 2017.

(51) Int. Cl.
| | |
|---|---|
| G06F 40/20 | (2020.01) |
| G06F 3/16 | (2006.01) |
| G06F 3/01 | (2006.01) |
| G06T 13/80 | (2011.01) |
| G06T 11/60 | (2006.01) |
| G06T 19/00 | (2011.01) |

(Continued)

(52) U.S. Cl.
CPC .............. *G06F 3/167* (2013.01); *G06F 3/017* (2013.01); *G06F 3/0484* (2013.01); *G06F 40/40* (2020.01); *G06T 11/60* (2013.01); *G06T 13/80* (2013.01); *G06T 19/00* (2013.01); *G06F 3/011* (2013.01); *G10L 15/00* (2013.01); *G10L 15/22* (2013.01)

(58) Field of Classification Search
CPC .................. G06T 19/006; G10L 15/005; G06F 16/24522; G06F 40/14; G06F 16/248; G06F 16/285; G06F 16/367; G06F 40/20; G06F 40/40; G06F 40/45; G06F 7/586
See application file for complete search history.

(56) References Cited

U.S. PATENT DOCUMENTS

| | | | | |
|---|---|---|---|---|
| 5,898,841 A | * | 4/1999 | Higgins | ................ H04L 1/0083 709/235 |
| 6,931,600 B1 | * | 8/2005 | Pittman | ................... G06F 16/95 715/767 |

(Continued)

OTHER PUBLICATIONS

"Bit Theory Uses ThinkStation Workstations for Visual Effects" http://youtu.be/OqVK1-cX4kU (Lenovo, Published Nov. 25, 2013).

(Continued)

*Primary Examiner* — Justin S Lee
(74) *Attorney, Agent, or Firm* — McDonnell Boehnen Hulbert & Berghoff LLP

(57) ABSTRACT

The present disclosure relates to systems, methods, and non-transitory computer-readable media that facilitate near real-time dynamic generation of graphical content based on audio, text, or gesture input. An example method includes receiving an input from an input device such as a microphone, a keyboard, or a camera. As such, the input may include text, speech, and/or a gesture. The method includes determining, based on the input, one or more command instructions. The method also includes determining, based on the one or more command instructions, a scene layout. Each of the one or more command instructions correspond to at least one element of the scene layout. The method also includes providing a rendered scene based on the determined scene layout.

16 Claims, 10 Drawing Sheets

(51) Int. Cl.
   *G06F 3/0484*   (2013.01)
   *G06F 40/40*   (2020.01)
   *G10L 15/22*   (2006.01)
   *G10L 15/00*   (2013.01)

(56) References Cited

U.S. PATENT DOCUMENTS

| | | | | |
|---|---|---|---|---|
| 7,949,224 | B2* | 5/2011 | Green | G06F 7/588 |
| | | | | 386/239 |
| 9,183,672 | B1* | 11/2015 | Hickman | G06T 17/00 |
| 2003/0004702 | A1* | 1/2003 | Higinbotham | G06F 40/47 |
| | | | | 704/2 |
| 2007/0146360 | A1* | 6/2007 | Clatworthy | G06T 15/20 |
| | | | | 345/419 |
| 2008/0117217 | A1* | 5/2008 | Bakalash | G06T 1/20 |
| | | | | 345/502 |
| 2009/0058860 | A1* | 3/2009 | Fong | G06F 40/20 |
| | | | | 345/467 |
| 2013/0173247 | A1* | 7/2013 | Hodson | G06F 40/45 |
| | | | | 704/4 |
| 2014/0310595 | A1* | 10/2014 | Acharya | G06T 11/00 |
| | | | | 715/706 |
| 2016/0232160 | A1* | 8/2016 | Buhrmann | G06F 16/367 |
| 2016/0311646 | A1* | 10/2016 | Bryant | B66B 1/468 |
| 2017/0221264 | A1* | 8/2017 | Perry | G06F 3/011 |
| 2018/0018959 | A1* | 1/2018 | Des Jardins | G10L 15/32 |
| 2018/0191992 | A1* | 7/2018 | Haimi-Cohen | H03M 7/3062 |

OTHER PUBLICATIONS

"Bringing CGI creation to the masses" https://web.archive.org/web/20150512074746/https://www.creativebloq.com/motion-graphics/cgi-creation-masses-11513896 (Creative Bloq, Published Jan. 14, 2015, Link to Version from May 12, 2015).
"Transforming Computer Graphics" http://www.cgw.com/Publications/CGW/2012/Volume-35-Issue-3-April-May-2012/Transforming-Computer-Graphics.aspx (Computer Graphics World, vol. 35, Issue 3, Apr./May 2012).
https://web.archive.org/web/20160712050826/http://www.eccotype.com:80/ (www.Eccotype.com Link to Version from Jul. 12, 2016).
"ThinkRevolutionist: Eccotype" https://www.thinkworkstations.com/tr-story/thinkrevolutionist-eccotype/ (ThinkRevolution, Jun. 2016).
https://vimeo.com/168998880 (Vimeo video, Uploaded 2016).
International Search Report and Written Opinion, International Application No. PCT/US2018/026843, dated Jun. 15, 2018.

* cited by examiner

NATURAL LANGUAGE BASED COMPUTER ANIMATION

CROSS-REFERENCE TO RELATED APPLICATION

This application claims priority to U.S. Patent Application No. 62/484,116, filed Apr. 11, 2017, which is hereby incorporated by reference in its entirety.

BACKGROUND

Conventional 3D animation can be demanding in terms of processing cycles and cost. Namely, rendering the 3D scenes of an animated movie may take weeks, months, or even years using hundreds of processors. Furthermore, conventional 3D animation is based on costly and often complicated software that favors operators with specialized knowledge in computer programming. In other words, conventional 3D scene generation, revision, and movie export may be too complicated for broad acceptance by amateur users. Accordingly, there exists a need for an intuitive, processor cycle-efficient, and lower cost way to dynamically-create graphical content.

SUMMARY

The present disclosure generally relates to the generation of 2D and 3D graphical computer animation based on natural language (e.g., speech or text), gesture input, and/or other types of input such as sensory or machine-based inputs (e.g., communications from an artificial intelligence construct or inputs from other computer systems). For example, the present disclosure may relate to systems and methods for the dynamic creation of three-dimensional graphical content. The present disclosure may also provide systems and methods for revising and exporting such content for display on conventional displays and/or augmented reality or virtual reality displays, or another type of visual medium (e.g., a hologram).

In a first aspect, a system is provided. The system includes an input device, a render processing unit, a display, and a controller. The controller includes at least one memory and at least one processor. The controller executes instructions so as to carry out operations. The operations include receiving, via the input device, input information indicative of at least one of: text, speech, or a gesture. The operations also include determining, based on the received input information, one or more command instructions. The operations yet further include determining, based on the one or more command instructions, a scene layout. The operations additionally include rendering, using the render processing unit, a rendered scene based on the determined scene layout. The operations also include displaying, via the display, the rendered scene.

In a second aspect, a method is provided. The method includes receiving an input. The input includes at least one of: text, speech, or a gesture. The method also includes determining, based on the input, one or more command instructions. The method further includes determining, based on the one or more command instructions, a scene layout. The method also includes providing a rendered scene based on the determined scene layout.

In a third aspect, a non-transitory computer readable medium is provided. The non-transitory computer readable medium has stored instructions that, when executed by a computing device, cause the computing device to perform operations. The operations include receiving an input, wherein the input comprises at least one of text, speech, or a gesture. The operations also include determining, based on the input, at least one command instruction. The operations yet further include determining, based on the at least one command instruction, a scene layout. The operations also include providing a rendered scene based on the determined scene layout.

Other aspects, embodiments, and implementations will become apparent to those of ordinary skill in the art by reading the following detailed description, with reference where appropriate to the accompanying drawings.

DETAILED DESCRIPTION

Figure 1:
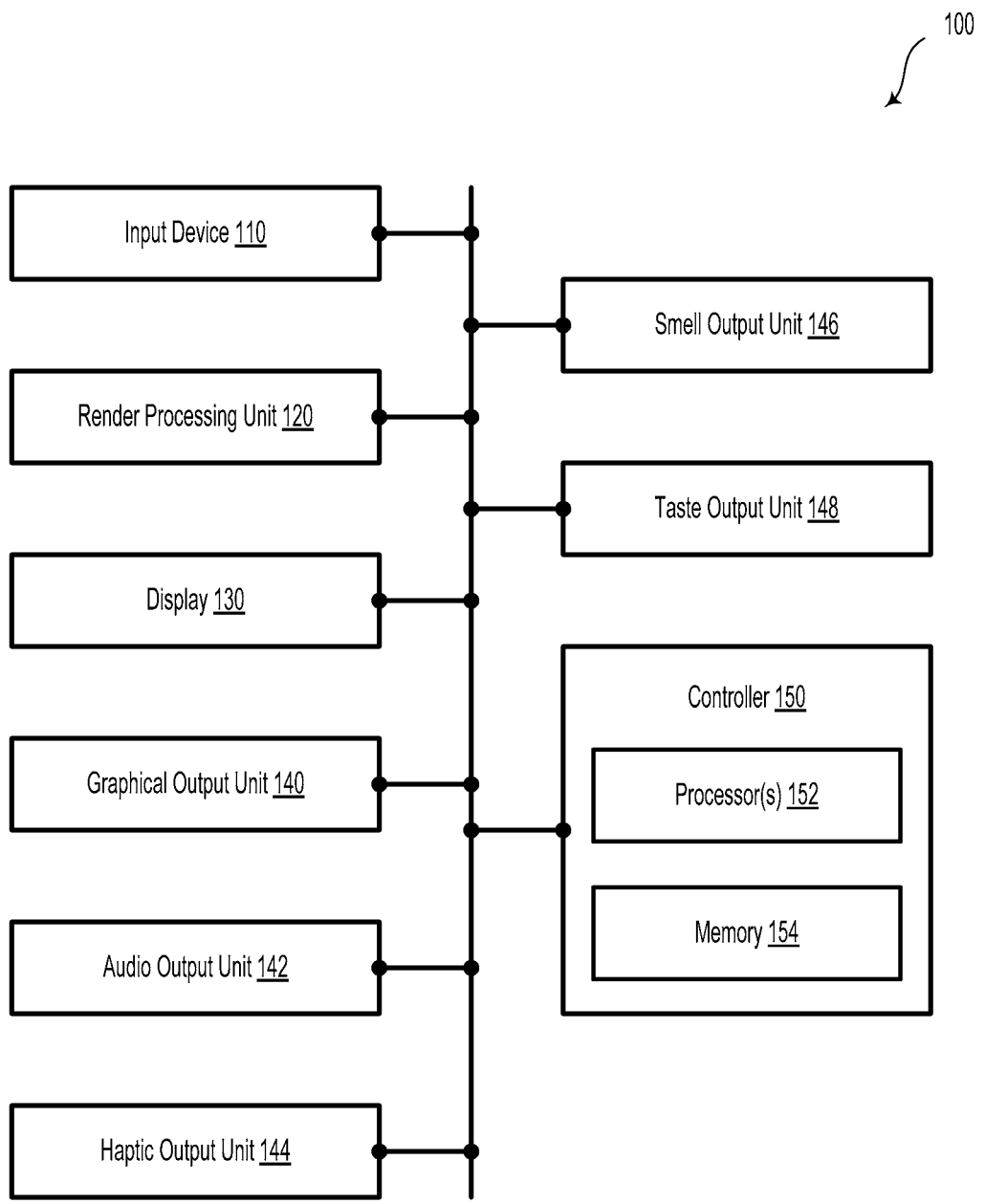
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Embodiments involving dynamic audio-visual content generation are described herein. For example, audio, text, gesture, or machine-based input descriptions can be converted into vector objects arranged at specific coordinates within a given scene layout. The given scene layouts may be rendered in near real-time (e.g., as fast as the user can provide text/speech/gesture input) to provide dynamic audio-visual content (e.g., movies, still images, video clips, etc.).

In an example embodiment, a user may provide text input in the form of an imported text document (e.g., Word, PDF document), or as a typed input into a graphical user interface. Additionally or alternatively, the user may provide audio input (e.g., speech). In some embodiments, spoken audio input could be first converted to text using a speech-to-text interface. As a further alternative, the input may be provided via a gesture (e.g., hand signal, body movement, etc.).

As a yet further alternative, the input may include a sensory input such as a brain signal from a human or an animal. Additionally or alternatively, the input could include a machine input, for example from an artificial intelligence construct or another computer.

The text/audio/gesture inputs are parsed into line segments, which are analyzed by text/speech/gesture recognition algorithms. The text/speech/gesture recognition algorithms may include various artificial intelligence constructs including, but not limited to: 1) a word construct configured to compare each word with a localized language lexicon to determine meaning; 2) a phrase construct configured to analyze short sentences or phrases based on punctuation; 3) a structure construct configured to determine meaning from the way words and verbiage are used; and 4) a relational construct configured to analyze the quantitative, qualitative, and relational properties for meaning.

It will be understood that various artificial intelligence constructs may access one or more databases for comparison and/or analysis. Furthermore, such databases may provide support for various written and spoken languages as well as gesture forms (e.g., English, Spanish, French, German, Mandarin, Korean, American Sign Language, HTML, or machine-based communication languages, etc.). Yet further, the database(s) may provide city, region, and/or country-specific information that relate to people, places, customs, and/or preferences in such locales.

Recognized line segments are converted into command instructions that may, for example, relate to a specific object, language element, or environmental element from a respective database. These objects, language elements, or environmental elements may be placed within the scene layout in near real-time or real-time. The objects and environmental elements within the scene layout may then be rendered in a high quality graphical format using a ray tracing algorithm or another type of rendering algorithm or engine. As an example, the rendering algorithm may include one or more of: real-time rendering, particle modeling, particle rendering, light field rendering, disparity rendering, and/or brute force rendering.

In some embodiments, the one or more command instructions could be categorized into at least one of: an object command instruction, a language command instruction, or an environmental command instruction. Furthermore, the one or more command instructions could include an action command instruction, which may be applied to one or more objects.

For example, in response to a text entry of "a bowling ball," systems and methods herein may provide a graphical rendering of a black bowling ball displayed as being stationary at an initial position on a neutral gray background. In such a scenario, editing the text entry to recite "a bowling ball falls" may associate the action of "falling" with the bowling ball. Accordingly, an animation may be applied to the bowling ball to show it falling downward from the initial position. In some embodiments, the animation may loop or repeat one or more times.

In some examples, objects may be presented with a default animation. For instance, in response to a text entry of "a person", systems and methods described herein may present a generic human (e.g., a stick figure, a typical human body, a typical man or woman, a random human body, etc.) that is breathing normally (e.g., chest rising and falling). Other types of default animations may be associated with various objects.

Among other possibilities, the scene layout could be determined based on an algorithm that includes a series of if/then/else statements. Such statements could determine, among other possibilities: 1) the subject of the scene layout (e.g., people, animals, personalities, organisms, etc.); 2) the time period of the scene layout (e.g., time of day, date, historical era, etc.); 3) the physical location of the scene layout (e.g., place, area, camera angle, blocking of objects, etc).

Objects, environmental elements, or actions corresponding to the respective command instructions could be called from respective databases. For example, graphical representations of people, buildings, things, etc. could be retrieved from an object database. Furthermore, graphical representations of skies, clouds, land masses, water masses, spaces, and planets could be retrieved from an environmental element database. Yet further, various actions such as movements, motion captures, or actions (e.g., running, walking, fighting, etc.) could be retrieved from an action database.

The objects or environmental elements in the respective databases could be formatted to include vector objects in a format with each object divided into 1000 layers along an x axis and 1000×1000 pixels in the y, z plane. In such a fashion, a 3D representation of each object or environmental element may be provided. Objects may be divided among a different number of layers and/or pixel extents.

While high resolution, 3D representations are described herein, it will be understood that it may be desirable to store and/or recall other types of graphical representations. For example, black and white, grayscale, cartoon-style, cell-shaded, two-dimensional, other high-resolution formats, and/or low-resolution (e.g., blocky 8-bit) representations are also possible and contemplated herein.

Retrieval of objects, environments, and/or actions, may be provided in the form of compressed vector objects. Such vector objects could be decompressed and placed on the "stage" or the scene layout. When a given object or environmental element is retrieved from a given database, the vector object may be decompressed based on where it is placed on the scene layout. For example, the vector object may be decompressed based on a viewing angle, a lighting angle, and its spatial relationship to other objects in the scene layout (e.g., taking into account foreground/background elements, occluding elements, etc.). Alternatively, objects, environments, and/or actions may be provided in the form of uncompressed vector objects.

While objects could be retrieved from an object database, it is also contemplated that the system and method described herein may be able to generate objects based on a dictionary definition only. For example, if a text input includes an object that is not provided in the object database, the system and method described herein may generate a "best guess" about the object based on a dictionary definition of the text entry.

Various aspects of the present disclosure may relate to and/or utilize artificial intelligence systems and methods.

For example, intelligent agents or constructs described herein may receive information indicative of user inputs (e.g., text, speech, gestures, etc.). In response, the agent or construct may take actions in an effort to maximize its chance of success (e.g., properly identifying and acting upon user inputs to provide dynamic graphical content). In some embodiments, intelligent agents or constructs described herein may mimic "cognitive" functions that may be associated with human "learning" and "problem solving." In other words, one or more functions described herein may utilize machine learning. For example, machine learning could be applied to one or more functions described herein to accurately predict proper command instructions, objects, actions, scene layouts, etc.

For example, an artificial intelligence construct could coordinate objects with movements and actions and provide rendering information to a dynamic render engine and overall timeline. Vector object locations may be plotted within the scene layout and rendering may be performed using a ray tracing algorithm. Additionally or alternatively, other types of render engines are possible and contemplated. The rendered scene may incorporate a variety of different lighting models. Furthermore, a rendered version of the scene layout may be provided as an output. In some embodiments, each of the data input through rendered version may be repeated. As described herein, the output may be provided to a user in various ways related to the five human senses. Namely, the output may include visual, audio, touch/haptic, smell, and/or taste feedback.

In some embodiments, the method or system could include version control, which may provide, for example, the option for users to remove previously applied elements (e.g., to "undo" changes to a scene layout). In some embodiments, a user interface may include on-the-fly editing by allowing text and/or other input changes in near real-time. For example, a user may adjust details about characters, locations, actions, camera angles, character speech, etc. The display may be updated with the adjusted details in near real-time. In other embodiments, the user interface may play back a "draft" scene for user review, editing, and/or approval.

II. Example Systems

FIG. 1 illustrates a system 100, according to an example embodiment. System 100 includes an input device 110, a render processing unit 120, a display 130, and a controller 150. Some or all of the elements of system 100 may be provided in a computing device. For example, the computing device could include a smartphone, a watch, a tablet computer, a laptop computer, a head-mountable display, a virtual reality headset, an augmented reality headset, a desktop computer, a cloud computing network, or another type of computing device. Optionally, system 100 may include a graphical output unit 140, an audio output unit 142, a haptic output unit 144, a smell output unit 146, and/or a taste output unit 148.

The input device 110 may include a microphone, a keyboard, a mouse, trackpad, touchpad, trackball, touchscreen, joystick, multi-axis controller (e.g., a 3D controller), and/or a camera. In some embodiments, the input device 110 could include an augmented reality headset/controller or a virtual reality headset/controller. In such scenarios, a user of the AR or VR headset may view a given scene and interact with system 100 using speech input, controller input (e.g., 3D joystick), and/or gesture input. Additionally or alternatively, the input device 110 could include an eye-tracking system. For example, one or more inputs to system 100 may include information indicative of a position and/or viewing angle of one or both of a user's eye(s).

In some example embodiments, input device 110 could include a communication interface configured to receive information. For example, the communication interface could be configured to receive point cloud and/or light field information. Such point cloud and/or light field information could be used to create a scene layout and/or one or more environmental elements, as described elsewhere herein. Other ways to provide input information to system 100 are contemplated in the present disclosure.

In some embodiments, the input device 110 may include devices configured to provide a direct communication pathway between a user's brain and system 100. In such scenarios, input device 110 may include, for example, a brain-computer interface (BCI), a mind-machine interface (MIMI), direct neural interface (DNI), or brain-machine interface (BMI). As an example, a BMI may include a motor neuroprosthetic that may directly translate a user's hand gestures into input commands to system 100. Additionally or alternatively, devices configured to transduce electrophysiological signals (e.g., local field potentials or LFPs) are contemplated. In such scenarios, such devices may provide information to the input device 110. Such information may be indicative of, for example, a user's LFP from a specific region of the user's brain. In some cases, the LFP signals may be obtained via physical electrode implants or wireless means. It will be understood that other ways to directly provide input from a user's motor or sensory cortex to system 100 are possible and contemplated herein.

Additionally or alternatively, some or all of the outputs provided by graphical output unit 140, audio output unit 142, haptic output unit 144, smell output unit 146, and/or taste output unit 148 may be provided to a user via such brain-machine interfaces. As an example, a BMI may include a visual neuroprosthetic such that the graphical output of system 100 may be provided directly to a user's visual cortex. Additionally or alternatively, an audio neuroprosthetic (e.g., a microelectrode device configured to stimulate the auditory nerve) may provide direct auditory output to a user's sensory cortex. It will be understood that other ways to directly provide outputs from system 100 to a user's sensory cortex are possible and contemplated herein.

Furthermore, although examples described herein include a human user providing input via input device 110, other computers or devices may be operable to provide the input to input device 110. For example, an artificial intelligence construct or another type of computing device may provide the inputs via input device 110. Yet further, while embodiments herein include providing an output to a human user, it will be understood that the output may be provided to another computing device and/or artificial intelligence construct. In other words, in some cases, methods and systems described herein need not include input from, or output to, a human user.

The render processing unit 120 includes at least one of: a central processing unit (CPU) or a graphics processing unit (GPU). In an example embodiment, the render processing unit 120 may include one or more dedicated graphics cards with GPUs configured to provide hardware-accelerated graphical calculations. For example, the render processing unit 120 may be configured to provide graphical capabilities such as, but not limited to, ray tracing, texture mapping, polygon rendering, vertex rotation and translation, programmable shaders, video decoding and encoding, physics processing, point clouds, light-fields, and motion compensation.

Display 130 may include a computer monitor or other visual output medium configured to provide visual information. For example, the display 130 may include a liquid crystal display (LCD), light-emitting diode (LED) display, holographic display, light field display, short or long-throw projection devices, or a cathode ray tube (CRT) display. Display 130 could be another type of display, such as a smartphone, laptop, etc. Display 130 may be configured to display a graphical user interface. Additionally or alternatively, display 130 may be configured to display the images generated by the dynamic content generation methods described herein.

In an example embodiment, display 130 may include a virtual reality display (e.g., a VR headset) or an augmented reality display (e.g., Microsoft Hololens or Google Glass).

The graphical output unit 140 may include a graphics engine and/or a communication link to an output target (e.g., a hard drive, a server, a mobile device). The graphical output unit 140 may be configured to provide the rendered scene for output to a desired graphical format and/or a desired type of device. For example, graphical output unit 140 may generate 3D videos or other types of graphical content that may be displayed on display 130.

In some embodiments, the output may be provided in an HTML-compatible format (e.g., HTML5) or another type of internet-compatible webpage format (suitable for viewing on a browser).

Additionally or alternatively, the graphical output unit 140 may provide the output using an application programming interface (API). For example, the API may include at least one of: Open GL, Direct 3D, Glide API, Mantle, Metal, RenderMan, RenderWare, or Vulkan. In some embodiments, the API may be a custom API.

Optionally, the graphical output unit 140 may provide the output using a graphics engine. The graphics engine could include at least one of: Unity Game Engine, Cry Engine, Unreal Engine, id Tech 4, id Tech 5, or Source. In some embodiments, the graphics engine may include a custom graphics engine.

As illustrated in FIG. 1, system 100 may include other types of output. For example, the other output units may be used to provide output for the non-visual senses. In an example embodiment, system 100 may include an audio output unit 142, a haptic output unit 144, a smell output unit 146, and a taste output unit 148.

The audio output unit 142 may be configured to provide audio output to a user. For example, the audio output unit 142 may provide music, spoken audio, and/or other sound effects (e.g., Foley effects) to a user of system 100. Furthermore, the audio output unit 142 may provide audio dialog that may be spoken by actors in the scene or by voice-over.

The haptic output unit 144 may be configured to provide output to a user that relates to the sense of touch. In some example embodiments, the haptic output unit 144 may provide touch sensations to a user's fingertips or other parts of the user's body. In some embodiments, the haptic output unit 144 may provide sensations of heat and/or cold. For example, the haptic output unit 144 may provide "rumble" feedback via a VR controller or a user seat (e.g., a chair). In some embodiments, the haptic output unit 144 may include a shaker mass and one or more actuators (e.g., motors) configured to move the shaker mass in a reciprocal fashion. Other ways to provide haptic feedback are contemplated.

The smell output unit 146 may be configured to provide output that relates to a user's sense of smell. For example, the smell output unit 146 may include a physical mister or sprayer configured to provide various scents that may be associated with a given scene, object, place, environment, and/or character. As non-limiting examples, the smell output unit 146 may be configured to provide any number of scents such as: a rose scent, perfume, cologne, fresh mountain air, salty ocean spray, fresh-cut grass, new-car smell, burning camp fire, foul-smelling garbage, sewer gas, etc.

The taste output unit 148 may be configured to provide output that relates to a user's sense of taste. The taste output unit 148 may include a mouthpiece or another type of device configured to interact with a user's taste sensory organs (e.g., a user's tongue). In an example embodiment, the taste output unit 148 may provide a predetermined amount of taste material to a user's mouth/tongue. The taste output unit 148 may provide several different taste sensations such as, but not limited to, sweetness, sourness, saltiness, bitterness, and umami. In some examples, other sensations that relate to taste either directly or indirectly, such as temperature (heat or cold), pungency, starchiness, fattiness, numbness, etc. are possible and contemplated herein.

Controller 150 includes at least one memory 154 and at least one processor 152. The controller 150 executes instructions so as to carry out operations. The operations include receiving, via the input device, input information indicative of at least one of: text, speech, or a gesture.

The operations also include determining, based on the received input information, one or more command instructions. In an example embodiment, determining the one or more command instructions includes parsing the received input information into a plurality of line segments. Once the received input information is parsed, the plurality of line segments may be processed in parallel or sequential with a natural language recognition algorithm. In such a scenario, the sequential processing includes comparing each of the line segments with a natural language command database.

The operations include determining at least one recognized line segment based on the comparison. The command instruction(s) may be based on the at least one recognized line segment.

The operations yet further include determining, based on the one or more command instructions, a scene layout. Each command instruction corresponds to at least one element of the scene layout. In an example embodiment, determining the one or more command instructions includes parsing the received input information into a plurality of line segments. Determining the one or more command instructions also includes sequentially or parallel processing the plurality of line segments with a natural language recognition algorithm. The sequential or parallel processing includes comparing each of the line segments with a natural language command database.

In some embodiments, determining the scene layout may include determining, for each object command instruction, at least one object and at least one corresponding object location. That is, when objects are pulled from the object database, such objects may be assigned a two- or three-dimensional coordinate at which they may be located with the "world space." Objects may include any "thing" that may be physically viewable and/or assignable to a coordinate within the world space. Objects could include, for example, a person, an animal, a car, a building, a puddle, a cloud, etc. The objects could be recalled from a database and could be 2D or 3D objects represented with vectors or pixels.

Furthermore, in some embodiments, determining the scene layout may include determining, for each environmental command instruction, at least one environmental element and at least one corresponding environmental element location. Environmental elements may include, but are not limited to, scenic effects such as backgrounds, lighting effects/sources (e.g., lamps, candles, stars, and sun), rain, fog, mist, snow, lens blur/bokeh, lens flare, etc.

The operations also include determining at least one recognized line segment based on the comparison. The command instructions may be determined based on the at least one recognized line segment.

The operations additionally include rendering, using the render processing unit 120, a rendered scene based on the determined scene layout.

The operations also include displaying, via the display 130, the rendered scene.

In some embodiments, the operations may include categorizing each command instruction into at least one of: an object command instruction, a language command instruction, or an environmental command instruction. The operations may additionally include storing each categorized command instruction into at least one corresponding database. In such scenarios, the corresponding database may include at least one of an object database, a linguistic database, or an environmental database.

In some embodiments, the determined command instructions could include a randomized selection from among a plurality of possible command instructions. As an example, a text input of "a person" could lead to a plurality of hundreds or thousands of different possible interpretations of "a person". In some such scenarios, a random number generator may generate a pseudo-random number, which may be associated with one possible interpretation of a person. In other words, the system 100 may generate a pseudo-random number which may be used to "choose" from among many different possibilities of a given word or phrase.

The controller 150 may perform the operations in near real-time. That is, the operations may include carrying out the determination of the command instructions and/or determining the scene layout at least once every 50 milliseconds. In other examples, such "refresh" operations could take place at least once within a range of 100 microseconds to 100 milliseconds. In some embodiments, the command instructions and/or determination of the scene layout may take place periodically or aperiodically. In some embodiments, the operations could take place on an as-needed basis, or the "refresh rate" could be dynamically-adjusted based on, for example, the objects, environments, and/or actions in a given scene. It will be understood that other time scales are possible and contemplated. For example, the scene layout may be determined 100 hundred times per second or once every 10 milliseconds.

The controller 150 may include an on-board computer, an external computer, or a mobile computing platform, such as a smartphone, tablet device, personal computer, wearable device, etc. Additionally or alternatively, the controller 150 may include, or be communicatively-connected to (e.g., via a wired or wireless connection), a remotely-located computer system, such as a cloud server. In an example embodiment, the controller 150 may be configured to carry out some or all method blocks or steps described herein.

The controller 150 may include one or more processors 152 and at least one memory 154. The processor 152 may include, for instance, an application-specific integrated circuit (ASIC) or a field-programmable gate array (FPGA). Other types of processors, computers, or devices configured to carry out software instructions are contemplated herein. The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

III. Example Methods

Figure 2:
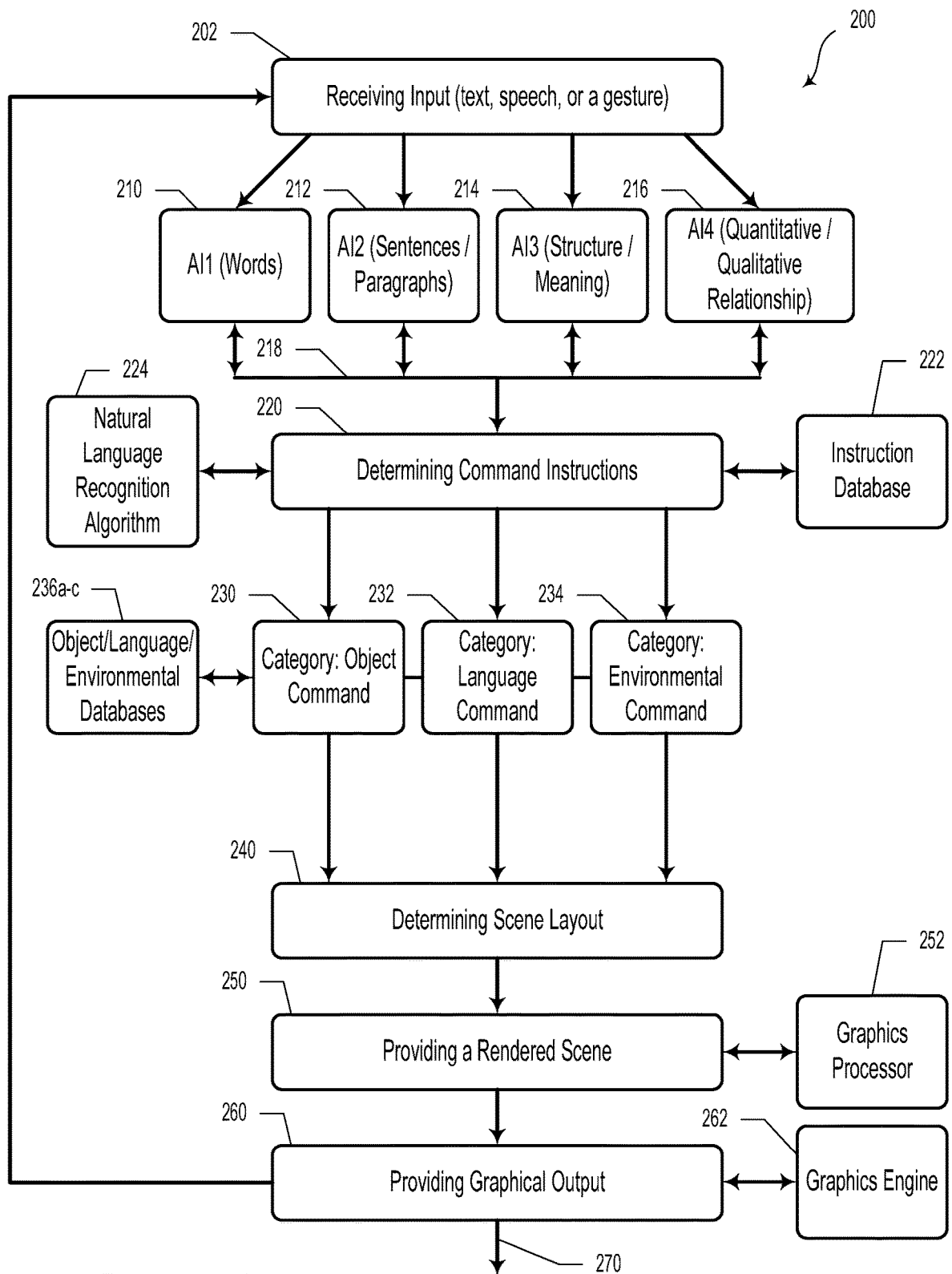
FIG. 2 illustrates a method, according to an example embodiment.

FIG. 2 illustrates a method 200, according to an example embodiment. Method 200 may include blocks, steps, or elements that may be carried out by one or more components of system 100 as illustrated and described with reference to FIG. 1. It will be understood that method 200 may include fewer or more steps or blocks than those expressly described herein. Furthermore, respective steps or blocks of method 200 may be performed in any order and each step or block may be performed one or more times.

Block 202 includes receiving an input. The input may include at least one of: text, speech, or a gesture. In some embodiments, text may be received via a keyboard or touch screen. As an example, the input may include text received via a text entry in a graphical user interface.

In an example embodiment, speech may be received via a microphone or another type of audio transducer. Additionally or alternatively, in some embodiments, gestures may be received via a camera and gesture recognition may be performed with image recognition methods.

Block 220 includes determining, based on the input, one or more command instructions. In some embodiments, determining the one or more command instructions may include parsing the input into a plurality of line segments. In such scenarios, each word or phrase may be parsed (e.g., by an artificial intelligence (AI) construct such as AI1 210) to determine its dictionary meaning and/or its collective, contextual meaning. For example, AI1 210 may parse each word and check the word against a localized language lexicon or dictionary for meaning.

In some instances, a second AI construct (e.g., AI2 212) may be used to analyze full sentences and/or paragraphs so as to determine meaning of the input. In some embodiments, AI2 212 may parse and analyze each sentence, phrase, question, or statement for meaning taking into account punctuation.

Additionally or alternatively, a third AI construct (e.g., AI3 214) could be used to determine meaning from the structure of a given phrase, sentence, or paragraph (e.g., word order, word choice, colloquial language, active/passive voice, punctuation). AI3 214 may analyze the input for structure and meaning from the way the words are used in context.

Yet further, another AI construct (e.g., AI4 216) may be used to analyze certain qualitative or quantitative relationships between objects such as size, foreground/background placement, scaling, relative movement, etc. AI4 216 may analyze the quantitative, qualitative and relational properties of every word throughout the entire body of text input into the text box. For example, AI4 may determine the spatial relationships between two objects or movement of an object within a given world space.

While the AI constructs are described as having certain analytic characteristics, other AI constructs with different analysis methods or types are possible. For example, one or more AI constructs could apply morphological segmentation to analyze the specific structure of words. Additionally or alternatively, an AI construct may analyze parts-of-speech, labeling each word as a noun, a verb, an adjective, etc. Yet further, an AI construct may be configured to analyze input text using a named entity recognition method. That is, the construct may map words and phrases to proper names, places, and/or locations, etc. Other types of AI constructs are possible and contemplated herein.

Determining the one or more command instructions may include processing the plurality of line segments with a natural language recognition algorithm 224. The natural language recognition algorithm 224 may include a machine learning language processing method, a statistical/probabilistic language model, a decision tree language model, or another type of natural language processing (NLP) method. The processing of the plurality of line segments may include a comparison of one or more of the line segments with a natural language instruction database 222.

In some embodiments, the natural language recognition algorithm 224 may provide audio dialogue that may be spoken by characters/objects within a given scene. In some such scenarios, entry of such dialogue may cause an object (e.g., a person) to be animated. That is, the person's lips and/or body (e.g., body language) may move in synchronization with the dialogue. As such, the presented scene may simulate a graphical person actually speaking the input dialogue. Furthermore, the dialogue could be presented to the user as spoken audio output.

Furthermore, some embodiments include determining at least one recognized line segment based on the comparison with the natural language instruction database 222. Accordingly, the one or more command instructions may be based on the at least one recognized line segment.

The order 218 of parsing and analysis may be performed sequentially and/or in parallel. For example, processing the plurality of line segments with a natural language recognition algorithm may include the plurality of line segments being processed sequentially with the natural language recognition algorithm. Additionally or alternatively, processing the plurality of line segments with a natural language recognition algorithm may include at least a portion of the plurality of line segments being processed simultaneously with the natural language recognition algorithm.

Put another way, in some embodiments, a given input may be first analyzed by AI1 210, then AI2 212, then AI3 214, and so on. In other embodiments, a given input may be analyzed by multiple AI constructs in a concurrent or simultaneous manner. It will be understood that, in some embodiments, recursive loops may be used to repeat analysis cycles. For example, in the case where the result of an analysis by a given AI construct results in an uncertainty level greater than an uncertainty threshold level with regards to a presumptive meaning of a given input, the analysis may be conducted again by the same AI or the results of the uncertain analysis may be analyzed by another AI construct. Such recursive analysis may eventually provide a higher certainty with regard to the meaning of the given input.

Among other aspects, the AI constructs may determine a variety of characteristics of objects, environments, and/or linguistics. For example, an AI may assess the subject (e.g., the "whom") in a given input sentence and determine that it refers to a given person, animal, personality, organism, etc.

Additionally or alternatively, the AI may assess a temporal nature of the given input (e.g., the "when"). For example, based on a textual and/or contextual analysis, the AI may determine from the input a given year, time period, era, etc.

Yet further, the AI may assess a location of the given input (the "where"). As an example, the AI may determine the places, areas, and/or camera angles as described by a given input.

Optionally, method 200 may include categorizing each of the one or more command instructions into at least one of: an object command instruction 230, a language command instruction 232, or an environmental command instruction 234. Upon categorization, each categorized command instruction may be stored into at least one corresponding database 236a-c. As an example, the corresponding database 236a-c may include at least one of an object database 236a, a linguistic database 236b, and/or an environmental database 236c. Object database 236a may include vector representations of people, places, things, buildings, or other types of objects for use in the world space scene layout. Linguistic database 236b may include text-to-speech audio clips, sound recordings (e.g., birds chirping, cars honking, etc.), artificial sound effects (e.g., Foley sound art, etc.), and/or audio soundstage parameters (e.g., echo, delay, room size, etc.). Environmental database 236c includes vector representations of skies, clouds, land and sea masses, space environments, planets, or other types of graphical scenery for use in the world space scene layout.

Block 240 includes determining, based on the one or more command instructions, a scene layout. Each of the one or more command instructions correspond to at least one element of the scene layout.

In an example embodiment, determining the scene layout may include determining, for each object command instruction, at least one object (e.g., a vector object) and at least one corresponding location within the world stage where the object is placed. Additionally or alternatively, determining the scene layout may include determining, for each environmental command instruction, at least one environmental element and at least one corresponding environmental element location. In some cases, the objects to be incorporated into the scene layout may have associated animations (e.g., an umbrella opening and closing, a person walking, etc.). In such scenarios, determining the scene layout may include determining in what order and/or at what time the animation will start and stop, etc.

As described elsewhere herein, vector objects and/or environmental elements may be randomly selected from a plurality of possible elements. In such a scenario, a random number generator may generate a pseudo-random seed. Determining the one or more command instructions is further based on selecting, from a plurality of command instructions associated with the pseudo-random seed. In another embodiment, determining the scene layout is further based on selecting, from a plurality of scene layouts associated with the pseudo-random seed.

Block 250 includes providing a rendered scene based on the determined scene layout. In such scenarios, the rendered scene may be provided by using a dedicated graphics processor 252. The rendered scene may be based on the determined scene layout. The dedicated graphics processor may include a graphics processing unit (GPU).

Additionally or alternatively, providing a rendered scene may include rendering the rendered scene using a central processing unit (CPU).

Block 260 may include providing an output 270 in an HTML5-compatible format.

Additionally or alternatively, the output 270 may be provided using an application programming interface. In such scenarios, the application programming interface may include at least one of: Open GL, Direct 3D, Glide API, Mantle, Metal, RenderMan, RenderWare, or Vulkan. Yet further, the output 270 may be provided using a graphics engine 262. The graphics engine 262 may include at least one of: Unity Game Engine, Cry Engine, Unreal Engine, id Tech 4, id Tech 5, or Source.

As described above, some or all of the blocks of method 200 may be repeated. Furthermore, in some embodiments, the method 200 is performed in near real-time. In an example embodiment, near real-time may include determining one or more command instructions at least once every 0.1-100 milliseconds and/or determining the scene layout at least once every 0.1-100 milliseconds. The method 200 may be performed at periodic intervals (e.g., 60 Hz, 600 Hz, etc.) or aperiodic intervals.

Figure 3A:
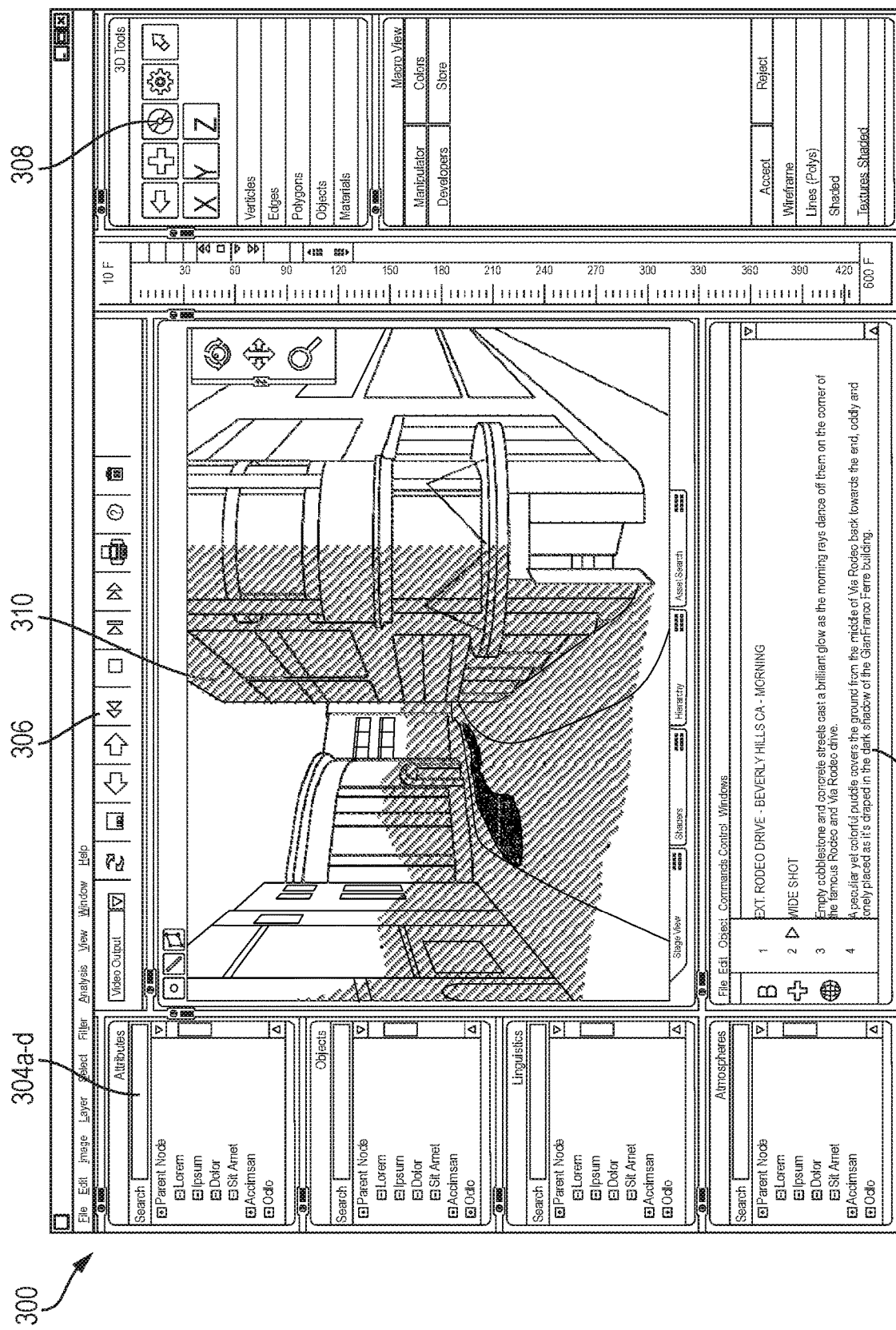
FIG. 3A illustrates a dynamic graphical generation scenario, according to an example embodiment.

FIG. 3A illustrates a dynamic graphical generation scenario 300, according to an example embodiment. The scenario 300 illustrates a graphical user interface with several elements, including a text entry window 302, several databases 304a-d, a tool bar 306, a 3D tool bar 308, and a scene display 310. The text entry window 302 may accept words, phrases, sentences, and/or paragraphs. As described herein, such input may be parsed and/or analyzed by various AI constructs so as to determine meaning from the input. Although a text entry window 302 is illustrated in FIG. 3A, it is understood that speech input could be transcribed into text for display in the text entry window 302. Furthermore, gesture inputs could likewise be transcribed or otherwise incorporated into the text entry window 302. Additionally or alternatively, speech input and/or gesture inputs could be handled or displayed elsewhere.

The databases 304a-d could include an object database, an atmosphere database, a linguistics/language database, an attributes database, etc. Other types of databases are possible and contemplated herein. The databases 304a-d may provide possible objects, attributes, atmospheric effects, etc. that may be selected for display in the scene display 310. In some cases, selected attributes need not be directly displayed in the scene display 310, rather such attributes (e.g., gravity, time of day, white balance, etc.) may affect how objects or atmospheric effects appear in the present scene display 310.

As illustrated in FIG. 3A, a user may import or type the following text into the text entry window 302:

EXT. RODEO DRIVE—BEVERLY HILLS Calif.—MORNING

WIDE SHOT

Empty cobblestone and concrete streets cast a brilliant glow as the morning rays dance off them on the corner of the famous Rodeo and Via Rodeo drive.

A peculiar yet colorful puddle covers the ground from the middle of Via Rodeo back towards the end, oddly and lonely placed as it's draped in the dark shadow of the GianFranco Ferre building.

End Scene

In response to the entered text, a computer (e.g., controller 150) may carry out method 200 so as to provide the scene display 310. For example, the AI constructs may analyze the text so as to derive its meaning. For instance, the contraction "ext." may be classified as an location attribute ("exterior" or "outside"). "Rodeo Drive—Beverly Hills Calif." would be interpreted by the AI construct as an atmospheric command ("location is Rodeo Drive in Beverly Hills, Calif."). Furthermore, "Wide Shot" may be interpreted as another atmospheric command ("use/simulate wide angle camera lens"). Yet further, "cobblestone and concrete streets" may be interpreted as objects with certain textures ("cobblestone patterned surface and concrete surface"). The other words may be similarly parsed. As a result, scene display 310 includes an exterior view of Rodeo Drive in Beverly Hills and a red-blue-green puddle in the shadow of the GianFranco building.

Figure 3B:
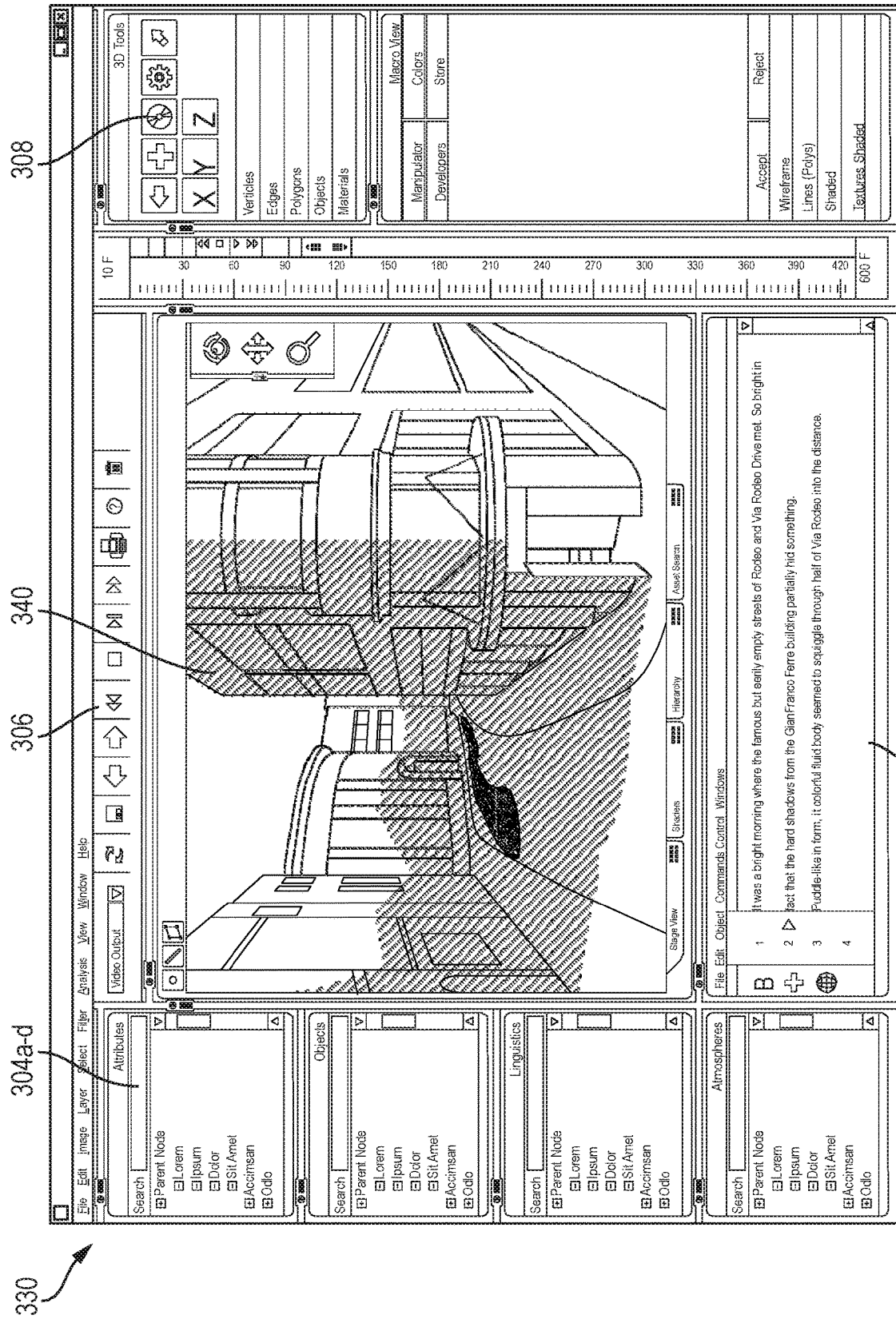
FIG. 3B illustrates another dynamic graphical generation scenario, according to an example embodiment.

FIG. 3B illustrates another dynamic graphical generation scenario 330, according to an example embodiment. Namely, the text entered in the text window 332 includes different phrasing and sentence structure. "It was a bright morning where the famous but eerily empty streets of Rodeo and Via Rodeo Drive meet. So bright in fact that the hard shadows from the GianFranco Ferre building partially hid something. Puddle-like in form, its colorful fluid body seemed to squiggle through half of Via Rodeo into the distance."

As the two inputs are different, some elements of the scene display 340 may be interpreted differently from scenario 300.

Figure 3C:
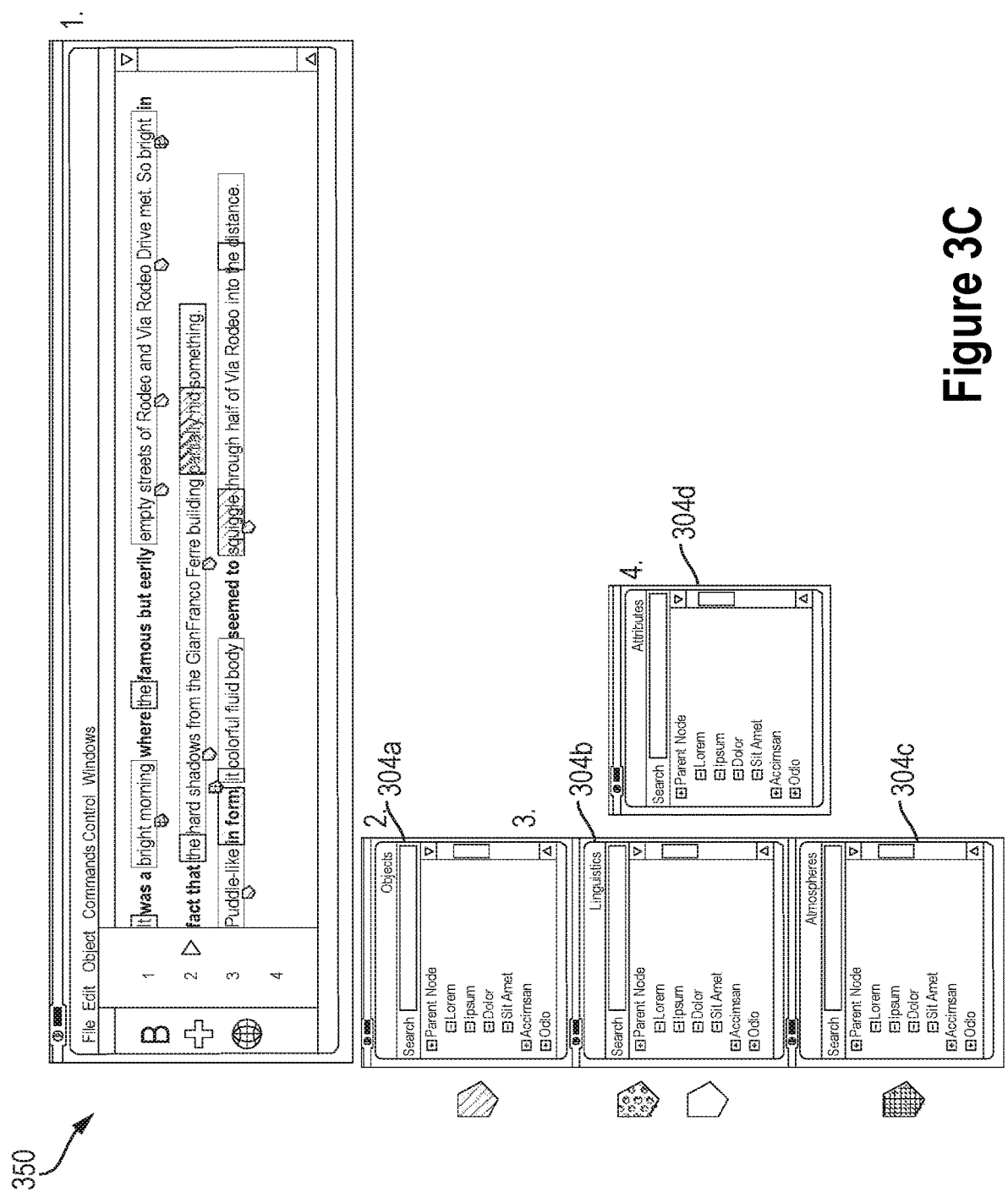
FIG. 3C illustrates a natural language recognition phase of the dynamic graphical generation scenario, according to an example embodiment.

FIG. 3C illustrates a natural language recognition phase 350 of the dynamic graphical generation scenario 330, according to an example embodiment. Namely, the natural language recognition phase 350 may include individual word/sentence/paragraph parsing so as to determine meaning as described with regard to AI1 210, AI2 212, AI3 214, and AI4 216 and illustrated in FIG. 2. Furthermore, the natural language recognition phase 350 may include categorization of recognized commands into several groups (e.g., object command 230, language command 232, and environmental command 234).

Figure 3D:
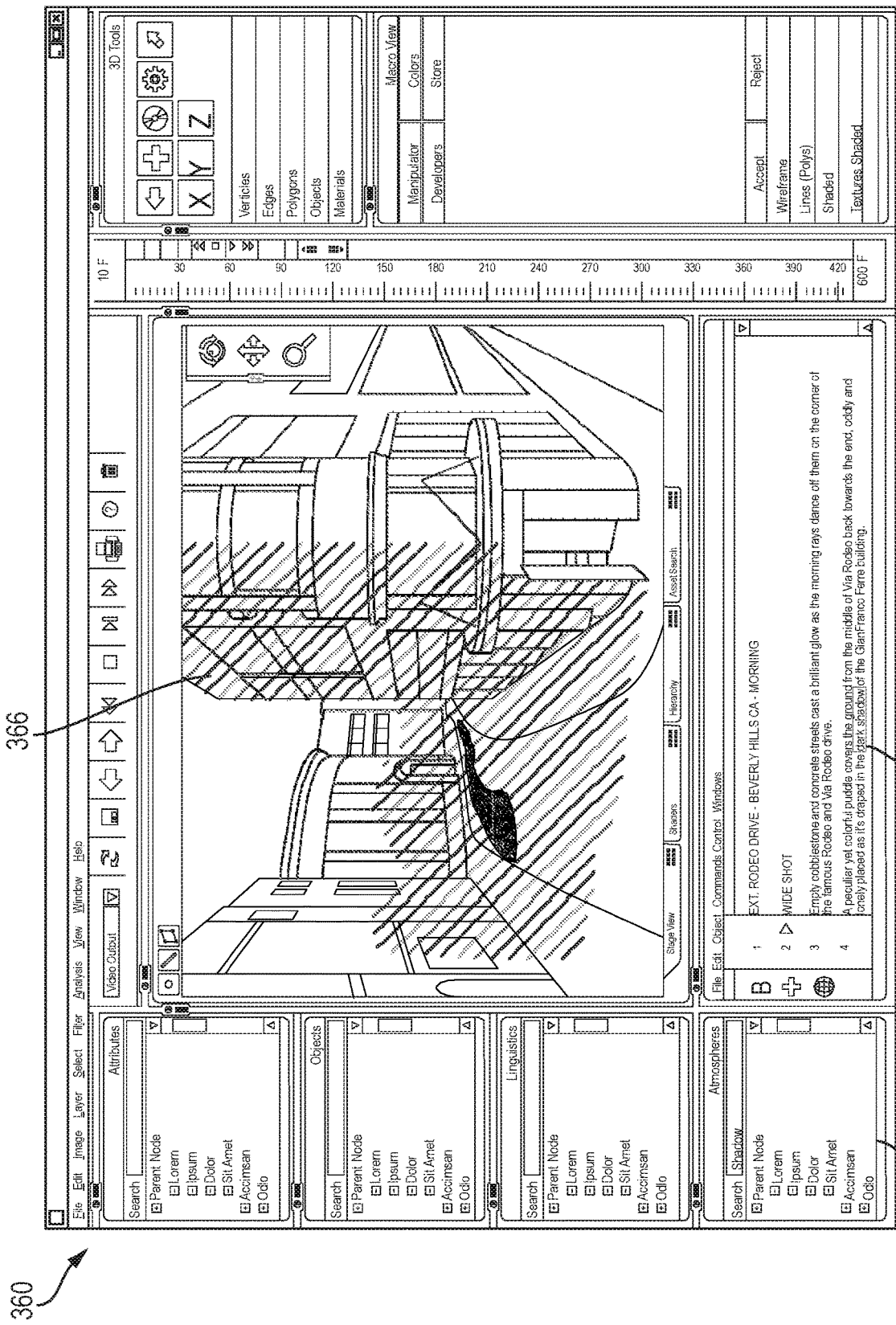
FIG. 3D illustrates a dynamic graphical generation scenario, according to an example embodiment.

FIG. 3D illustrates a dynamic graphical generation scenario 360, according to an example embodiment. As illustrated in text window 362, a user may edit the existing text to adjust scene display 366 directly. Additionally or alternatively, by selecting certain words from the input text, a user may adjust an object or effect associated with the selected text. In this case, "dark shadow" is selected. In such a scenario, a user may be offered the option to soften or darken the shadow that is applied in the scene display 366. As an example, the building's shadow can be lightened by removing the word "dark" from the input text or adjust the modifier of "shadow" as being "soft" or even "transparent". As illustrated in scene display 366, the shadow has been brightened slightly, making the puddle more visible.

Figure 3E:
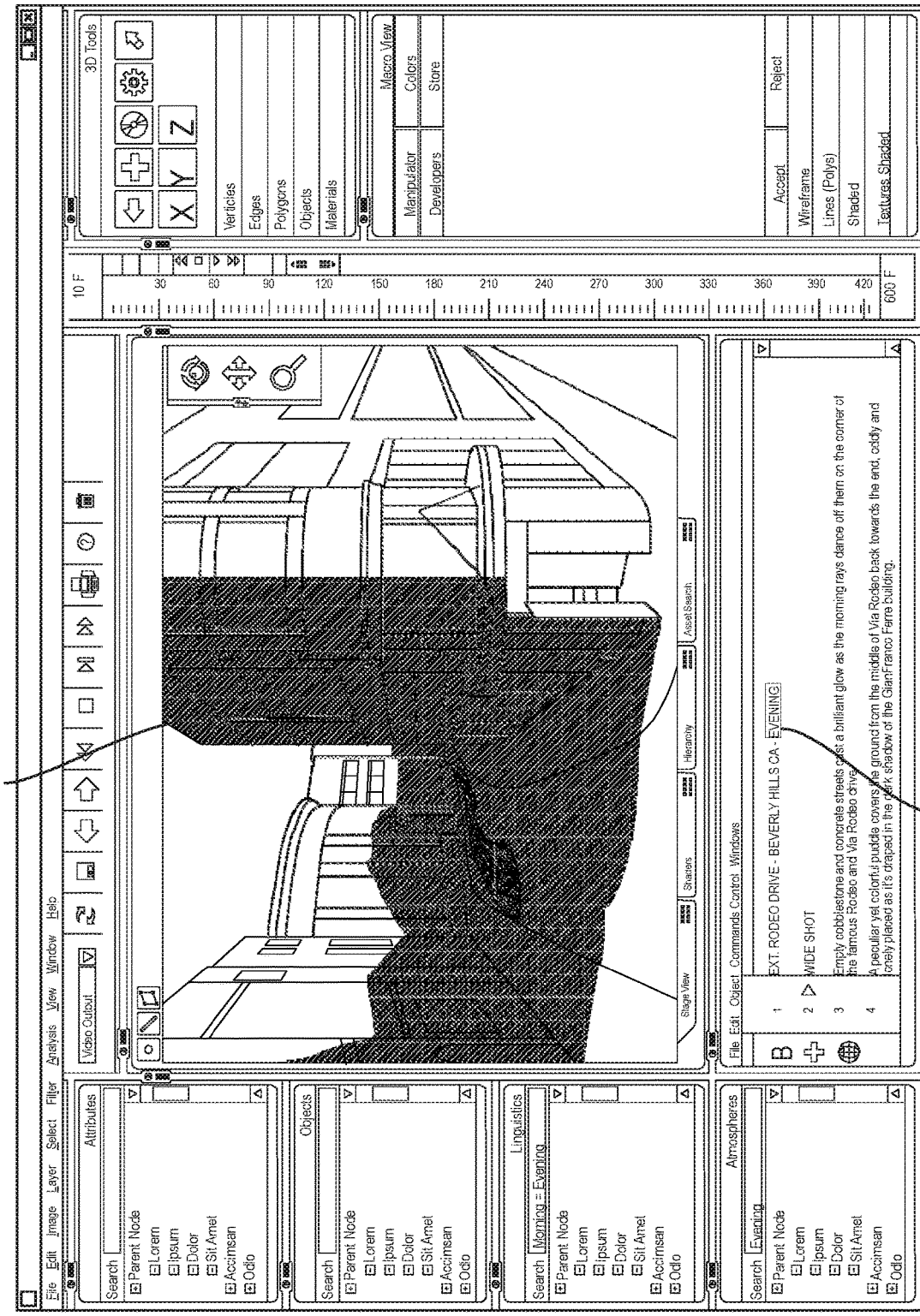
FIG. 3E illustrates a further dynamic graphical generation scenario, according to an example embodiment.

FIG. 3E illustrates a further dynamic graphical generation scenario 370, according to an example embodiment. As illustrated in scenario 370, another way to modify the scene display 376 is to adjust the input text 372 from "morning" to "evening." The word "evening" may be analyzed by the AI construct as changing the time of day. As such, the lighting may darken, the shadows may deepen, and the white balance of the light source may be adjusted as illustrated in scene display 376. Accordingly, the puddle may be even less visible than in previous scene displays.

Figure 4A:
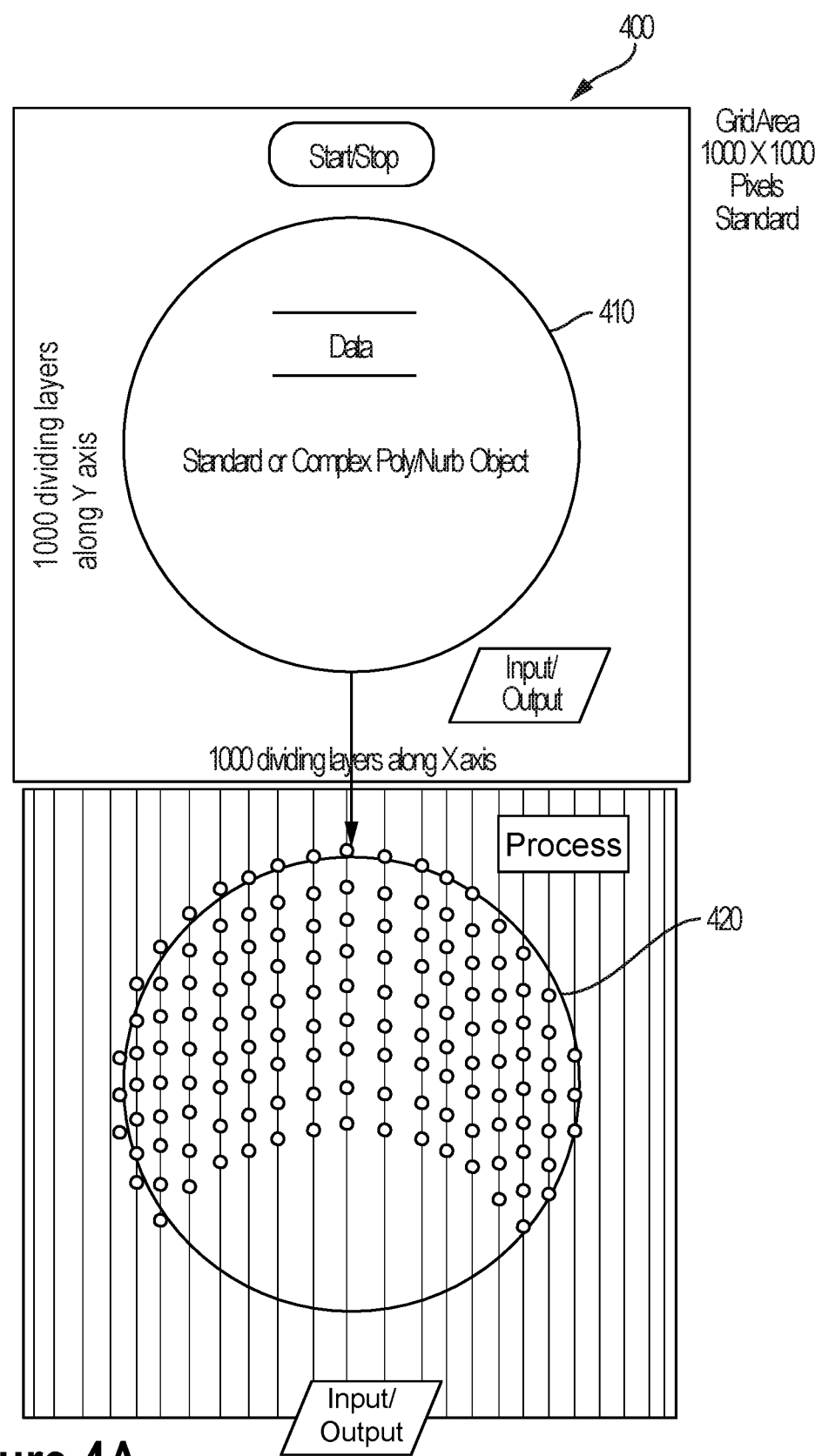
FIG. 4A illustrates a vector object process, according to an example embodiment.

FIG. 4A illustrates a vector object process 400, according to an example embodiment. When a given object 410 (in this case a sphere) is loaded into the vector object database, the object is divided into 1000 layers in the x-direction to form vector object 420. Specifically, vector object 420 is created by recording the points at which the given object 410 intersects with a 1000×1000×1000 three-dimensional (e.g., x, y, z) grid and storing (y, z) coordinates for each layer in the x direction. It will be understood that vector object 420 could be defined using a differently-sized grid (e.g., 2000× 2000×1000). Accordingly, the compression/decompression method that follows may include a different number of layers, based on the grid utilized.

When the vector object 420 is stored in the vector object database, each of the 1000 layers are compressed down into a single layer so that the intersection points overlay one another as vectors. Each intersection point in the vector carries with it information about its related layer and spatial coordinates (e.g., y-location, z-location, and x-layer). As such, when vector object 420 is stored in the vector object database, the effective memory usage to store the compressed version may be substantially less than if an entire 1000×1000×1000 grid is stored with respect to a "full" representation of the given object 410. Accordingly, for a similar number of objects, such a vector object database may take up much less memory/disk space than a database that includes full 3D representations of the objects.

Figure 4B:
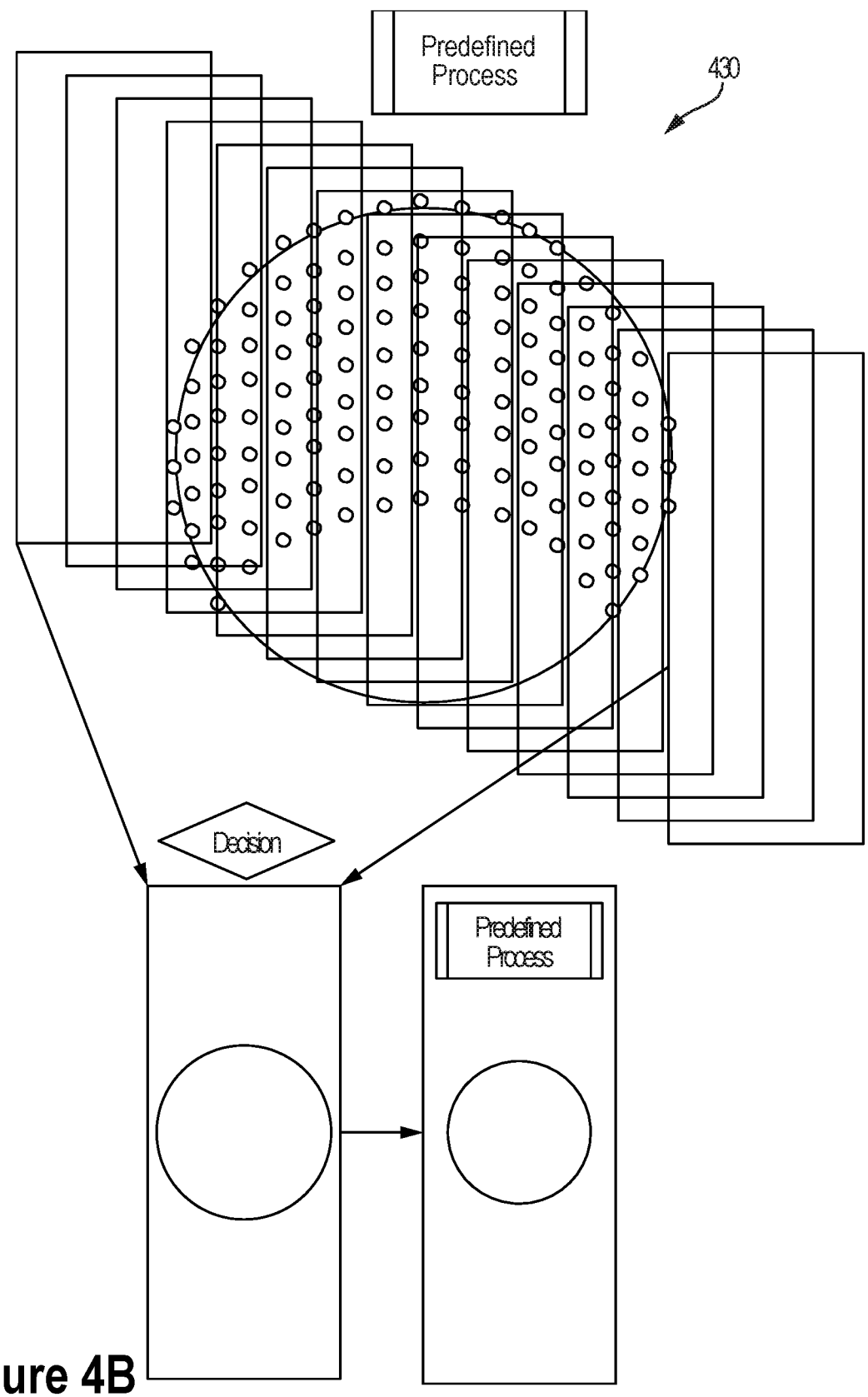
FIG. 4B illustrates a vector object process, according to an example embodiment.

FIG. 4B illustrates a vector object process 430, according to an example embodiment. Namely, when the vector object 420 is called from the vector object database, the vector object 420 is decompressed by expanding the object back out into its 1000 layers in the x-direction. Accordingly, vector object 420 may load much more quickly than a full representation of the given object 410. For example, the compressed vector object may take up 1/1000 of the memory of an uncompressed object. Furthermore, by utilizing GPUs, which may handle vectors and vector objects particularly efficiently, loading, placement, and animation of such vector objects may be provided in a dynamic, near-real time manner.

The vector objects and atmospheric elements described herein may be stored in separate vector databases that use similar compression/decompression methods. As such, the objects and atmospheric effects may be dynamically incorporated into the world stage in near-real time. For example, objects and atmospheric effects may be called, displayed, and in some cases animated, essentially as fast as a user can enter inputs by typing, speaking, and/or gesturing.

Figure 5:
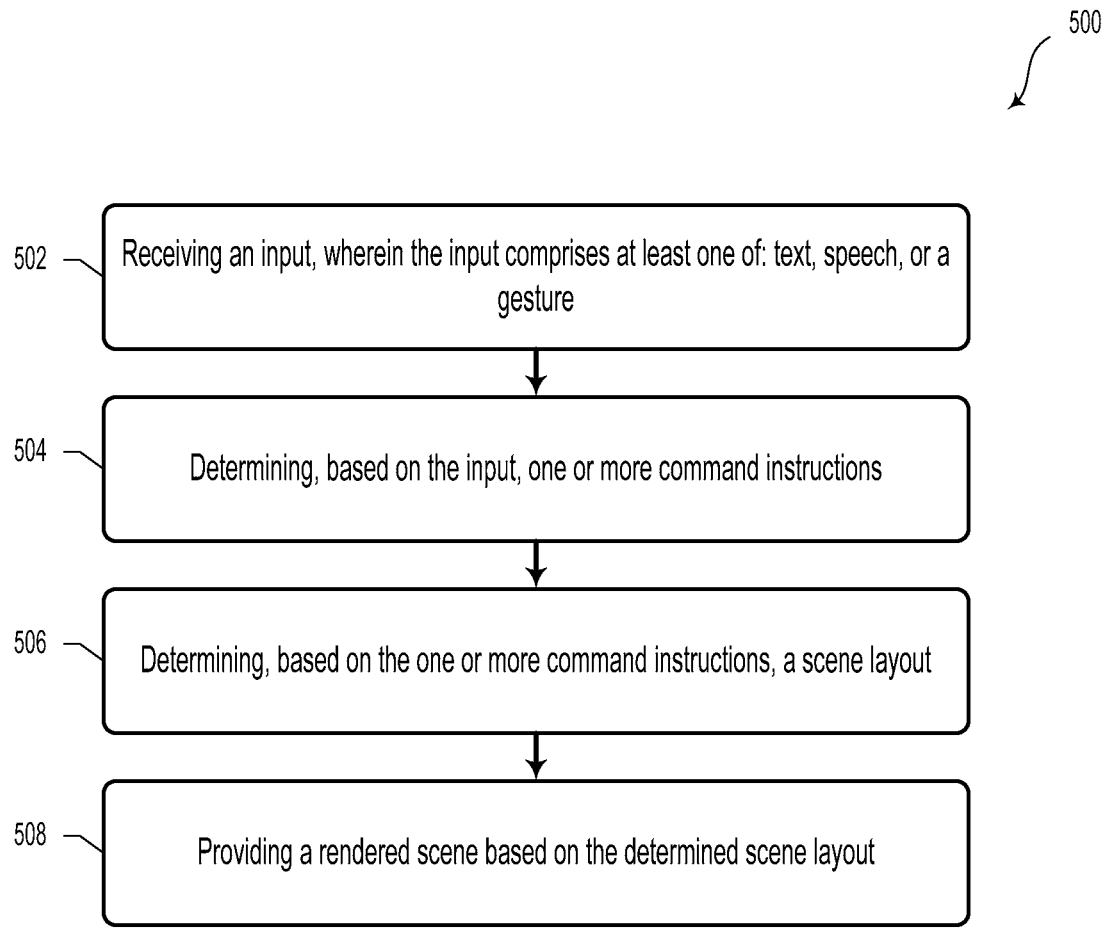
FIG. 5 illustrates a method, according to an example embodiment.

FIG. 5 illustrates a method 500, according to an example embodiment. Method 500 may include blocks, steps, or elements that may be carried out by one or more components of system 100 as illustrated and described with reference to FIG. 1. It will be understood that method 500 may include fewer or more steps or blocks than those expressly described herein. Furthermore, respective steps or blocks of method 500 may be performed in any order and each step or block may be performed one or more times. Some blocks or steps of method 500 may be similar or identical to one or more blocks or steps of method 200, as illustrated and described in reference to FIG. 2.

Block 502 includes receiving an input, wherein the input comprises at least one of: text, speech, or a gesture.

Block 504 includes determining, based on the input, one or more command instructions.

Block 506 includes determining, based on the one or more command instructions, a scene layout.

Block 508 includes providing a rendered scene based on the determined scene layout.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
   receiving an input, wherein the input comprises at least one of: text, speech, or a gesture;
   determining, based on the input, one or more command instructions, wherein determining the one or more command instructions comprises:
      parsing the input into a plurality of line segments;
      processing the plurality of line segments with a natural language recognition algorithm, wherein the processing comprises comparing each of the line segments with a natural language command database; and
      determining at least one recognized line segment based on the comparison, wherein the one or more command instructions are based on the at least one recognized line segment;
   categorizing each of the one or more command instructions into at least one of: an object command instruction, and an environmental command instruction;
   storing each categorized command instruction into at least one corresponding database, wherein the corresponding database comprises at least one of: an object database and an environmental database;
   determining, based on the one or more command instructions, a scene layout, wherein determining the scene layout comprises:
      determining, for each object command instruction, at least one object and at least one corresponding object location;
      determining, for each environmental command instruction, at least one environmental element and at least one corresponding environmental element location;
   retrieving determined objects and determined environmental elements from a vector object database comprising compressed vector objects, wherein retrieving comprises decompressing a respective vector object based on a corresponding object location or environmental element location; and providing a rendered scene based on the determined scene layout.

2. The method of claim 1, wherein each of the one or more command instructions correspond to at least one element of the scene layout.

3. The method of claim 1, wherein the input comprises text, wherein receiving the input comprises receiving the text via a text entry in a graphical user interface.

4. The method of claim 1, wherein the input comprises speech, wherein receiving the input comprises receiving the speech via a microphone.

5. The method of claim 1, wherein the input comprises a gesture, wherein receiving the input comprises receiving the gesture via a camera.

6. The method of claim 1, wherein processing the plurality of line segments with a natural language recognition algorithm comprises the plurality of line segments being processed sequentially with the natural language recognition algorithm.

7. The method of claim 1, wherein processing the plurality of line segments with a natural language recognition algorithm comprises at least a portion of the plurality of line segments being processed simultaneously with the natural language recognition algorithm.

8. The method of claim 1, further comprising generating a pseudo-random seed with a random number generator, wherein determining at least one of: the one or more command instructions or the scene layout is further based on selecting a respective command instruction or respective scene layout associated with the pseudo-random seed.

9. The method of claim 1, wherein providing a rendered scene comprises rendering, using a dedicated graphics processor, the rendered scene based on the determined scene layout, wherein the dedicated graphics processor comprises a graphics processing unit (GPU).

10. The method of claim 1, further comprising providing an output in an HTML-compatible format.

11. The method of claim 1, further comprising providing an output, wherein the output comprises a format that is compatible with at least one of: a virtual reality display or an augmented reality display.

12. The method of claim 1, wherein the method is performed in near real-time, wherein near real-time comprises at least one of: determining the one or more command instructions at least once every 50 milliseconds or determining the scene layout at least once every 50 milliseconds.

13. The method of claim 1, wherein one or more steps of the method are carried out by an intelligent agent or artificial intelligence construct that utilizes machine learning.

14. A system comprising:
an input device;
a render processing unit;
a display; and
a controller comprising at least one memory and at least one processor, wherein the controller executes instructions so as to carry out operations, the operations comprising:
receiving, via the input device, input information indicative of at least one of: text, speech, or a gesture;
determining, based on the received input information, one or more command instructions, wherein determining the one or more command instructions comprises:
parsing the received input information into a plurality of line segments;
processing the plurality of line segments with a natural language recognition algorithm, wherein the processing comprises comparing each of the line segments with a natural language command database;
determining at least one recognized line segment based on the comparison, wherein the at least one command instruction is based on the at least one recognized line segment;
categorizing each of the one or more command instructions into at least one of:
an object command instruction, and an environmental command instruction;
storing each categorized command instruction into at least one corresponding database, wherein the corresponding database comprises at least one of: an object database and an environmental database;
determining, based on the one or more command instructions, a scene layout, wherein determining the scene layout comprises:
determining, for each object command instruction, at least one object and at least one corresponding object location;
determining, for each environmental command instruction, at least one environmental element and at least one corresponding environmental element location;
retrieving determined objects and determined environmental elements from a vector object database comprising compressed vector objects, wherein retrieving comprises decompressing a respective vector object based on a corresponding object location or environmental object location; and
rendering, using the render processing unit, a rendered scene based on the determined scene layout; and
displaying, via the display, the rendered scene.

15. The system of claim 14, wherein the display comprises at least one of: a virtual reality display or an augmented reality display.

16. A non-transitory computer readable medium having stored therein instructions that, when executed by a computing device, cause the computing device to perform operations comprising:
receiving an input, wherein the input comprises at least one of: text, speech, or a gesture;
determining, based on the input, at least one command instruction, wherein determining the at least one command instruction comprises:
parsing the input into a plurality of line segments;
processing the plurality of line segments with a natural language recognition algorithm, wherein the processing comprises comparing each of the line segments with a natural language command database;
determining at least one recognized line segment based on the comparison, wherein the at least one command instruction is based on the at least one recognized line segment;
categorizing each of the one or more command instructions into at least one of: an object command instruction, and an environmental command instruction;
storing each categorized command instruction into at least one corresponding database, wherein the corresponding database comprises at least one of: an object database and an environmental database;
determining, based on the at least one command instruction, a scene layout, wherein determining the scene layout comprises:

determining, for each object command instruction, at least one object and at least one corresponding object location;
determining, for each environmental command instruction, at least one environmental element and at least one corresponding environmental element location;
retrieving determined objects and determined environmental elements from a vector object database comprising compressed vector objects, wherein retrieving comprises decompressing a respective vector object based on a corresponding object location or environmental object location;
providing a rendered scene based on the determined scene layout, wherein each command instruction corresponds to at least one element of the scene layout;
categorizing each command instruction into at least one of: an object command instruction, a language command instruction, or an environmental command instruction;
storing each categorized command instruction into at least one corresponding database, wherein the corresponding database comprises at least one of: an object database, a linguistic database, or an environmental database; and
providing an output in an HTML-compatible format.

* * * * *